A. WILLHARDT.
NUMBER PLATE HOLDER FOR MOTOR VEHICLES.
APPLICATION FILED JULY 10, 1912.
1,142,002.
Patented June 8, 1915.
2 SHEETS—SHEET 2.
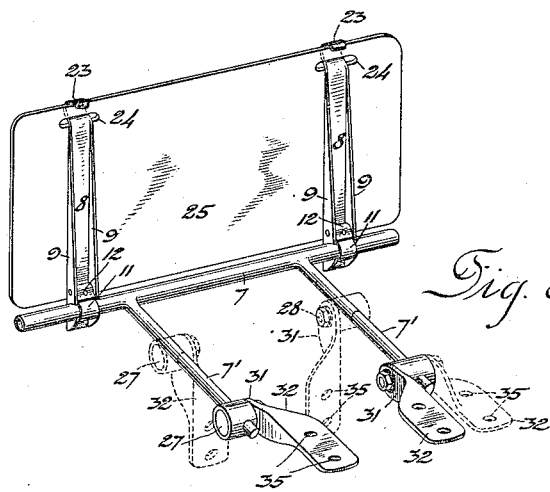
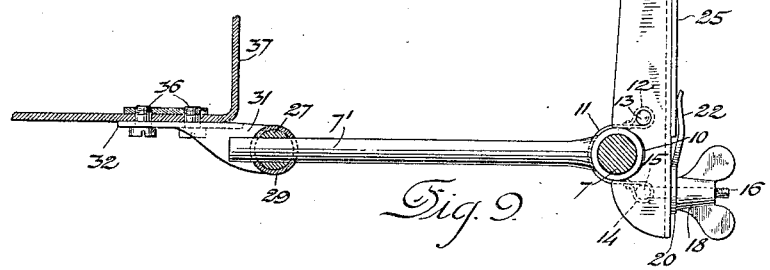
WITNESSES:
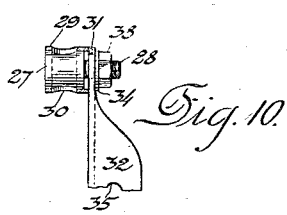
INVENTOR
Adam Willhardt
BY
Henry J Miller
ATTORNEY

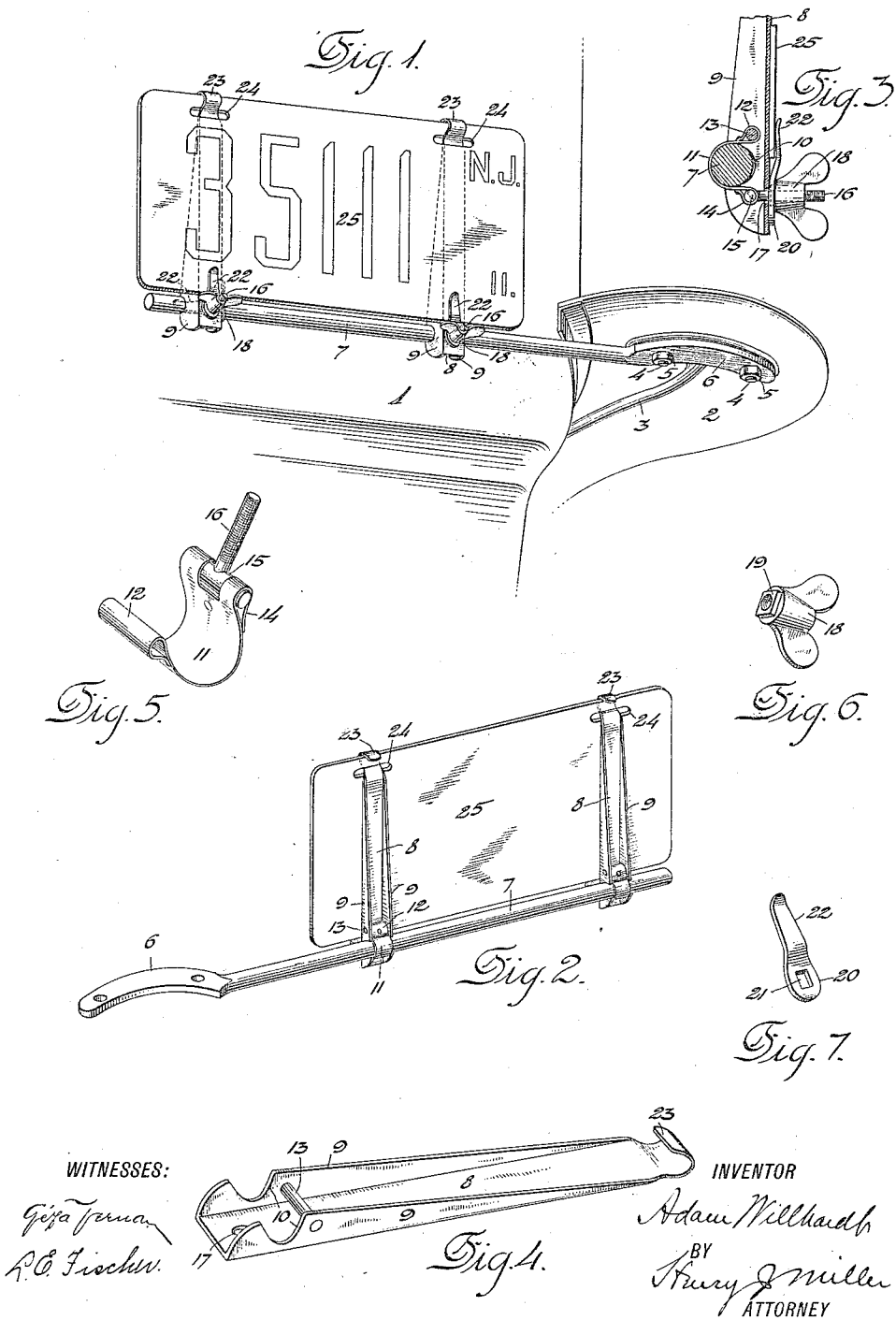

UNITED STATES PATENT OFFICE.

ADAM WILLHARDT, OF ELIZABETH, NEW JERSEY.

NUMBER-PLATE HOLDER FOR MOTOR-VEHICLES.

1,142,002.  Specification of Letters Patent.  Patented June 8, 1915.

Application filed July 10, 1912. Serial No. 708,550.

*To all whom it may concern:*

Be it known that I, ADAM WILLHARDT, a citizen of the United States, residing at Elizabeth, in the county of Union and State of New Jersey, have invented certain new and useful Improvements in Number-Plate Holders for Motor-Vehicles, of which the following is a specification, reference being had therein to the accompanying drawings.

This invention relates to sign-plate holding devices designed more particularly for application to motor vehicles, and it has for its object to sustain the license number-plate securely in position for easy removal, to provide adjusting means for accommodating number plates of different sizes, and to provide further means of adjustment whereby the number-plate may be arranged in the most advantageous position relative to the different parts of the vehicle, such as a radiator connected with the jacket of an explosive engine and the lamp at the rear of the vehicle, one of whose functions is to illuminate the sign.

As preferably constructed, the sign-plate holder comprises a supporting bar having an angularly arranged stem or shank entering transverse apertures in the head of a clamp-bolt and in a surrounding sleeve extending beyond said head, the clamp-bolt passing through an aperture in a bracket-piece rigidly secured to the vehicle and having a nut whereby the head of the bolt is drawn toward the bracket-piece to thrust the sleeve against the latter and thereby clamp the stem or shank of the supporting bar between said relatively movable parts. In the most approved form of the invention, the supporting bar carries two upright standards each formed at its upper or outer end with an offset portion in the form of a hook adapted to enter one of the elongated apertures or slots usually formed in the upper margin of the number-plate. Each standard has at its base a lateral seat fitted to one side of the bar which is embraced on the opposite side by a strap having one end attached to the lower portion of the standard and the other end terminating in a bolt passing through the standard and provided with a clamp-nut for tightening the strap upon the bar, while permitting the adjustment of the standard both circularly and endwise thereof when loosened. The clamp-nut preferably has an angular boss entering a similar aperture in a washer formed with a clamping finger adapted to engage the unapertured margin of the number-plate and clamp the same securely upon the face of the standard. Each standard thus has an interlocking and positively acting connection with one margin of the number-plate and a clamping or frictional fastening with the other margin thereof.

In the accompanying drawings, Figure 1 is a perspective view representing the present improvement applied to the mud-guard at the rear of the body of an automobile. Fig. 2 is a similar view from the opposite side of the holding device, detached. Fig. 3 is an enlarged sectional elevation showing the means for securing the base of the standard adjustably upon the supporting bar for clamping the lower margin of the number-plate to the standard. Figs. 4, 5, 6 and 7 are perspective views showing detached the several members of the fastening means represented in Fig. 3. Fig. 8 is a perspective view similar to Fig. 2 representing a preferable form of the means for sustaining the supporting bar, and Fig. 9 is an enlarged sectional elevation of the same. Fig. 10 is a sectional elevation of the bracket-piece and clamping means for sustaining the supporting bar, and Figs. 11, 12 and 13 are perspective views representing details of the same.

As represented in Figs. 1 to 7, the automobile body 1 is provided with the usual mud-guard 2 secured to the bracket 3 by means of the clamping bolts 4 and nuts 5. Secured to the under side of the bracket by the bolts 4 is the flattened and apertured shank 6 of the supporting bar 7 extending inwardly rearward of the body 1. Sustained by the bar 7 are the spaced channeled posts or standards 8 whose side flanges 9 are formed with notches or recesses 10 near the lower end to form outwardly flaring seats adapted to engage one side of the supporting bar 7, the other side being embraced by the strap 11 having at one end the loop 12 entered by the transverse thrust sustaining pin 13 and having at the opposite end a second loop 14 which embraces the cross-pin 15 affording the head of the threaded-bolt 16 which passes through an aperture 17 in the web of the post 8 and has applied thereto the thumb-nut 18 which is formed in the end toward the post with the square boss 19. Surrounding the bolt 16 and arranged intermediate the nut 18 and the post is the washer 20 formed with a square aperture 21 fitted to the boss 19 of the nut 18 and provided with a slightly offset clamping finger 22. The extremity of the standard 8 opposite that containing the lateral seat 10 is formed with an outwardly and upwardly bent portion 23 forming a hooked lug adapted to enter one of the alined apertures or slots 24 in the upper marginal portion of the number-plate 25, which is shown in Fig. 1 provided with the usual motor-vehicle license number.

To apply the number-plate, the clamp-nut 18 of each post is first loosened by giving it a quarter-turn or more, as represented at the left in dotted lines in Fig. 1, and the number-plate applied by slipping the apertured upper margin over the hooked extremities 23 of the posts 8, and turning the body of the number-plate so as to rest upon the flat outer faces of the posts. The nuts 18 are then turned sufficiently to tighten the straps 11 upon the bar 7 and at the same time to turn the fingers 22 of the washers 20 into overlapping or clamping relation with the lower margin of the number-plate, as represented in Fig. 1. By this means, the number-plate is locked against endwise or edgewise movement by the engagement of the bent upper portions of the posts 8 with the walls of the slots 24 while the number-plate is prevented against swinging to free itself from the hooks 23, and from rattling, by means of the clamping fingers 22. As will be observed by reference to Fig. 1, the effective portions of the hooked extensions 23 of the standards are the parts inclined forwardly from the face of the latter, the upper portions of each of which engage the upper edge of the sign-plate slot 24 at the front face of the sign-plate so as to firmly seat the rear face thereof upon the forward face of the standard. The rounded upper portions of the members 23 have therefore no holding function in themselves, but merely serve to finish the operative inclined portions and prevent the projection of the extremities of the latter forwardly of the face of the sign-plate. As will be observed, the sign-plate, resting upon the faces of the standards is suspended from the upper marginal portion by means of the hooked extensions 23, whereby it is rigidly gripped at the front and rear faces of its upper margin, the clamping elements 22 serving merely to grip the lower margin of the sign-plate between themselves and the forward faces of their respective standards. By this means, the sign-plate is firmly gripped at its opposite margins and is held in fixed relation with the standards so as to insure against rattling or working loose in its clamping means. The same movement of the clamp-nuts 18 which thrust the fingers 22 into and out of fastening relation with the number-plate causes the tightening and loosening of the strap 11 upon the supporting bar 7 by means of which the posts are adjustably secured in position, but the washers 20 are so placed upon the angular boss 19 that they assume their clamping position upon the number-plate only as the strap is drawn to its final clamping condition, the nuts being backed off in practice more than a quarter-turn in order to loosen the base of the boss sufficiently to be shifted either endwise or circularly upon the bar 7 to accommodate number-plates of different sizes or to vary the position of the number-plate circularly upon such bar.

It is evident that by slipping the posts 8 off the bar 7 and reversing them so that their flattened faces will be disposed at the same side of the bar 7 but their hooked extremities 23 will be directed downwardly therefrom, the number-plate may be as readily sustained below the bar, in cases where a convenient means of support for the bar is arranged otherwise than as represented in Fig. 1. In this case the lower margin of the number-plate would obviously be formed with slots 24 to accommodate the hooked extremities 23 of the then depending posts.

In order to provide a greater degree of adjustment to increase the range of use of the sign-plate holder as above described, the means for sustaining the supporting bar may be constructed as represented in Figs. 8 to 13 inclusive. In this preferred modification of the device, the supporting bar 7 is provided with two parallel shanks or stems 7' rigidly connected therewith and in angular relation to the same. Each of these stems enters a transverse aperture 26 in the head 27 of a bolt 28 with threaded outer portion, as represented more particularly in Fig. 11. Slipped over this bolt-head is a sleeve 29 having the diametrically arranged transverse apertures 30 also entered by the stem 7'. When the apertures 26 and 30 are in register, one end of the sleeve 29 slightly overhangs the inner end of the bolt-head 27, as represented in Fig. 10. The bolt 28 passes through an aperture in the lug 31 of the bracket-piece 32, and has applied thereto the clamp-nut 38 with intermediate split lock-washer 34 by means of which the bolt-head 27 and sleeve 29 are drawn toward the lug 31, the end of the sleeve 29 being seated firmly upon the latter, when the two members are locked together by the stem 7' passing through both. By the means above described, the stem is clamped firmly upon the opposite walls of the apertures 26 and 30 and the supporting bar 7 maintained in position accordingly. The foot of each bracket 32 is formed with apertures 35 through which are inserted the fastening screws 36 for attaching the same to a convenient part of the vehicle body 37, as represented in Fig. 9, and by loosening the clamp-nuts 38, it is evident that the bar 7 may be adjusted not only toward and from the body 37 but upwardly or downwardly relative thereto upon the common axis of the bolts 28. This range of adjustment is evidently very desirable because the conditions for application of the number-plates at the front and rear of the vehicle are quite different, and it is desirable that a single style of fitting be employed for sustaining the number-plate in any position where it is required. As will be readily seen, in this modification of the improvement the means for securing the sign-plate in position upon the bar 7 are the same as in the construction represented in Figs. 1 to 7 inclusive.

I have herein shown and described what I consider to be the preferable embodiments of the present invention, but it is obvious that the individual fastening means for the different parts and the arrangement of the component members of the holder are not essential to the present invention and may be widely varied within the scope of the same. It is deemed preferable to employ two posts or standards for sustaining the sign-plate upon the supporting bar, but it is evident that by varying the proportions a single post might be made to answer in lieu of two spaced apart, as represented in the drawings.

Having thus set forth the nature of the invention, what I claim herein is:—

1. A sign-plate holder comprising a supporting bar, and a rigid standard having means for securing it in transverse position thereon and provided at opposite ends with means for gripping the sign-plate at both faces and adjacent opposite margins thereof.

2. A sign-plate holder comprising a supporting bar, a plurality of longitudinally and circularly adjustable standards mounted thereon and each carrying at one end fastening means adapted to interlock with apertures in one margin of a sign-plate and at the other end clamping means adapted for engagement with the other margin of said sign-plate, and fastening means for maintaining said standards in their adjusted position and serving also to hold the clamping means in position.

3. A sign-plate holder comprising a supporting bar, and a standard having sign-plate fastening means and provided at its base with a lateral seat engaging one side of said bar and a strap embracing the other side of said bar and terminating in a bolt passing through said standard and provided with a clamp-nut whereby the standard is secured upon said bar suitably for adjustment both endwise and circularly thereof.

4. A sign-plate holder comprising a supporting bar, and a standard having positively acting sign-plate fastening means at one end and provided at the opposite end with a lateral seat engaging one side of said bar and a flexible strap engaging the other side of said bar and terminating in a bolt passing through the standard laterally of said seat and provided with a clamp-nut and an interposed laterally extending sign-plate clamping washer overlying said seat, whereby the tightening of the nut serves to secure the standard adjustably in position upon said bar and to clamp the adjacent margin of the sign-plate upon the standard.

5. A sign-plate holder comprising a supporting bar, and a standard having positively acting sign-plate fastening means at one end and provided at the opposite end with a lateral seat engaging one side of said bar and a flexible strap engaging the other side of said bar and terminating in a bolt passing through the standard and provided with a clamp-nut and an interposed sign-plate clamping washer having an interlocking connection with said nut, whereby the tightening of the nut serves to secure the standard adjustably in position upon said bar and to clamp the adjacent margin of the sign-plate upon the standard.

In testimony whereof, I have signed my name to this specification, in the presence of two subscribing witnesses.

ADAM WILLHARDT.

Witnesses:
H. J. MILLER,
H. A. KORNEMANN, Jr.

Copies of this patent may be obtained for five cents each, by addressing the "Commissioner of Patents, Washington, D. C."